E. PIRON.
METHOD OF EXTRACTING AMMONIA.
APPLICATION FILED JULY 20, 1918.
1,324,979.
Patented Dec. 16, 1919.
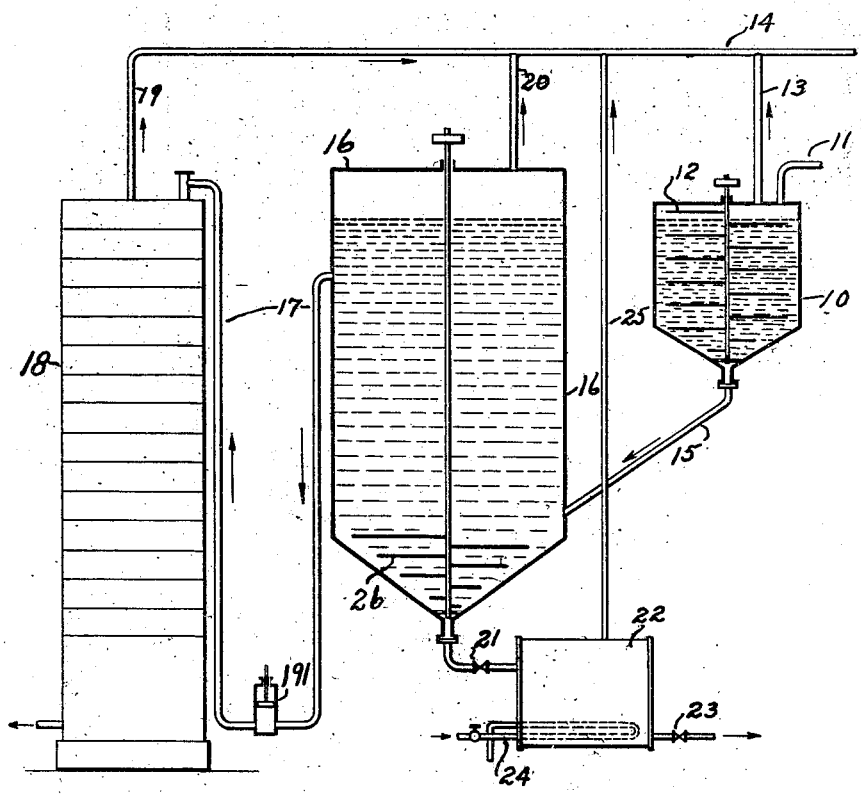
Inventor
EMILE PIRON
By his Attorney

UNITED STATES PATENT OFFICE.

EMILE PIRON, OF NEW YORK, N. Y.

METHOD OF EXTRACTING AMMONIA.

1,324,979.   Specification of Letters Patent.   Patented Dec. 16, 1919.

Application filed July 20, 1918. Serial No. 245,910.

*To all whom it may concern:*

Be it known that I, EMILE PIRON, a subject of the King of Belgium, residing at New York city, in the county of New York, State of New York, have invented certain new and useful Improvements in Methods of Extracting ammonia.

The present invention relates to improvements in methods for extracting ammonia from ammoniacal waters and particularly from such waters derived from coke ovens and the like.

One of the objects of my invention is to provide a simple and effective method by which a very pure ammonia gas may be obtained.

With this and other objects in view, my invention consists of the novel method herein described and pointed out in the appended claim.

The crude ammoniacal waters from coke ovens and the like have heretofore been made alkaline, usually with milk of lime, at a very high temperature. This high temperature, however, is very detrimental to the purity of the ammonia obtained because of its effect on the volatile acids. If a low temperature is maintained during the mixing of the alkali with the crude ammoniacal waters, these volatile acids are better absorbed by the lime.

In my novel method, therefore, I first mix the crude ammoniacal waters with a suitable alkali, preferably milk of lime, and then pass the mixture into the bottom of a decanter of large size. In this decanter, the precipitates drop to the bottom and the clear ammonia water is taken off at the top of the decanter. This clear liquid is then distilled in any suitable manner to drive off the ammonia vapor.

In the accompanying drawing I have illustrated a suitable arrangement of apparatus to carry out my method in its preferred form. 10 is a mixer into which the crude ammonia waters are introduced through a pipe 11, and with it a sufficient quantity of the alkali, in this instance milk of lime, in sufficient quantity to make alkaline the crude waters. A stirrer 12 is provided for the mixer 10 and a pipe 13 carries any ammonia which may arise from the contents of the mixer 10 into an outlet pipe 14.

The contents of the mixer 10 pass through the pipe 15 into the lower part of the decanter 16. From the upper part of the decanter 16, a pipe 17 carries the clear liquid into a suitable distilling apparatus 18, a pump 19¹ being used for this purpose. The ammonia from the distilling apparatus 18 passes through the pipe 19 into the common outlet pipe 14. The decanter 16 is also provided with a pipe 20 connected to pipe 14 to convey away any free ammonia arising in the decanter.

The decanter 16 is provided with an outlet at its bottom controlled by a valve 21. The pipe from the bottom of the decanter leads into a reservoir 22 provided with an outlet controlled by a valve 23. Reservoir 22 is also provided with a suitable apparatus for heating, such as steam coils 24, and a pipe 25 connecting to the ammonia outlet 14. The decanter is also provided with a stirring apparatus 26 at its bottom.

The precipitates from the bottom of the decanter 16 are drawn off from time to time through a valve 21 into the reservoir 22, the stirrer 26 being used to cause them to flow through the opening.

In the reservoir 22, these precipitates are heated, as by the steam coil 24, and the ammonia contained therein is driven off through the pipe 25. After this step has been completed, the contents of reservoir 22 are passed out through the valve 23.

It will be noted that in my novel method, no heat is applied to the mixture until after the reaction between the alkali and the volatile acids has been completed and this results in the gas passing through the pipe 14 being extremely pure. It will be understood also that the apparatus which I have indicated is merely illustrative and that my method may be carried out by any suitably arranged apparatus.

I claim—

The method of extracting ammonia from crude ammoniacal waters from coke ovens and the like, consisting of thoroughly mixing the waters while at approximately atmospheric temperature and without preheating, with non-preheated alkali at approximately atmospheric temperature, passing the mixture continuously to the bottom of a decanter and continuously drawing off the clear liquid therefrom and permitting the precipitates to settle therein, passing the clear liquid continuously to a still and extracting the ammonia therefrom, and drawing off the precipitates from the decanter from time to time.

E. PIRON.